United States Patent [19]
Canoy

[11] 3,855,727
[45] Dec. 24, 1974

[54] FLY TRAP APPARATUS
[76] Inventor: Grant Canoy, 3221 Third Ave., Great Falls, Mont. 59401
[22] Filed: July 27, 1972
[21] Appl. No.: 275,471

[52] U.S. Cl............ 43/65, 43/100, 43/122
[51] Int. Cl............. A01m 1/02
[58] Field of Search....... 43/122, 121, 107, 65, 100

[56] References Cited
UNITED STATES PATENTS

| | | | |
|---|---|---|---|
| 418,233 | 12/1889 | Sallade................. | 43/121 |
| 798,670 | 9/1905 | Gee...................... | 43/65 |
| 914,571 | 3/1909 | Health et al. ......... | 43/65 X |
| 2,076,972 | 4/1937 | Tucker................. | 43/100 X |
| 3,497,989 | 3/1970 | Schultz et al. ........ | 43/100 |

FOREIGN PATENTS OR APPLICATIONS
265,975  3/1966  Australia............... 43/100

Primary Examiner—F. Barry Shay
Attorney, Agent, or Firm—Joseph H. Golant

[57] ABSTRACT

A fly trap apparatus having two identical members which are engageable at one end portion and which have funnel shaped fly openings at the other ends. The members also have a bait tray and slots so that the aroma of the bait may permeate the vicinity of the apparatus and thereby attract flies. The apparatus is inexpensive, easy to use and safe.

3 Claims, 8 Drawing Figures

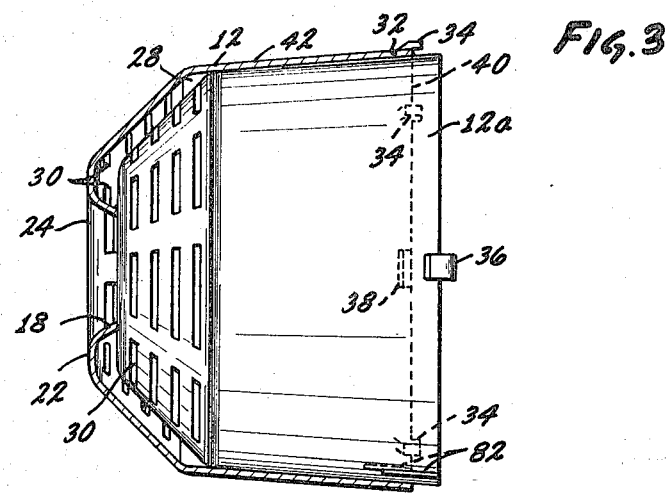
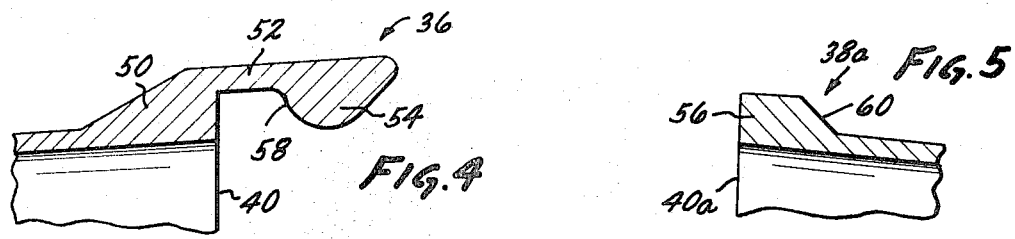
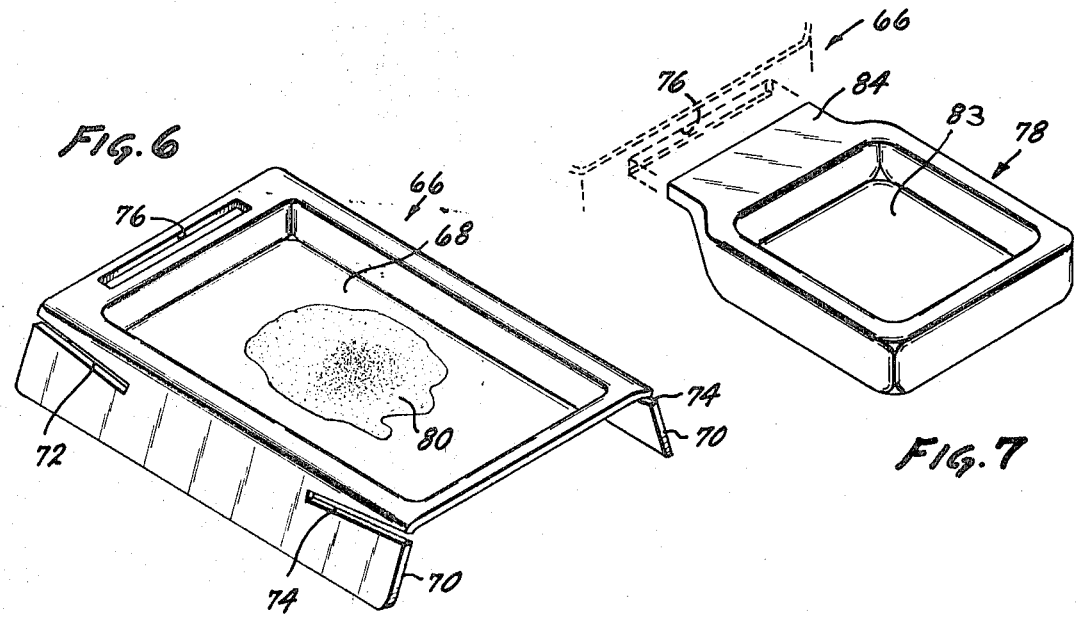

FLY TRAP APPARATUS

BACKGROUND OF THE INVENTION

1. Field of the Invention

The present invention relates to a fly trap apparatus and more particularly to an improved fly trap container with which to attract and retain flies; the fly trap is economical to produce and is perfectly safe.

2. Description of Prior Art

The problem of bothersome household flies has plagued man for a considerable period of time; in response to this problem various types of fly trap apparatus have been developed, for example, see U.S. Pat. No. 1,085,329, issued in 1914. However, developing a fly trap which works well has proven to be difficult. Developing a fly trap which works well and can be manufactured and marketed at a reasonable cost has proven to be exceedingly difficult.

Recently, chemically treated material has been developed to deter flies. However, the use of potentially harmful chemicals in the home has come under attack. Thus, there is still a need for an apparatus for disposing of flies which is environmentally safe.

The present inventor has concluded that in order to develop an apparatus for effectively catching flies and for being commercially acceptable an apparatus would have to be structurally simple so as to be easily and inexpensively manufactured, be susceptible to economical packaging and yet be totally safe so as to be usable within a living quarter without fear of contaminating the occupants of the living quarter.

SUMMARY OF THE INVENTION

The abovementioned problems of the prior art have been overcome by the present invention which fulfills the requirements determined by the inventor. The present invention is a trap for attracting and retaining flies comprising a first member having a first end portion including a funnel shaped opening and a plurality of apertures, and a second end portion including a large opening, a guide arm, an attachment arm and an attachment bead; a second member having a first end portion including a funnel shaped opening and a plurality of apertures, and a second end portion including a large opening, a guide arm, attachment arm and an attachment bead, the attachment arm of the first member being engageable with the attachment bead of the second member, and the attachment arm of the second member being engageable with the attachment bead of the first member, whereby the first and second members are identical and are engageable along the second end portions of the members.

It is a general aim of the present invention to provide an improved fly trapping and retention apparatus.

Another aim of the present invention is to provide a fly trap which is simply constructed and economical to produce.

Still another object of the present invention is to provide a fly trap which may be economically packaged and yet be suitable for display at the point of sale.

Other important aspects of the present invention are to provide a fly trap which is safe, to provide a fly trap which can be hung or set down and which is aesthetically pleasing in appearance so as to be decorative, to provide a fly trap which may be easily used and manipulated and to provide a fly trap which may be conveniently used indoors or outdoors.

Other objects and advantages of the invention will appear from the following description taken in conjunction with the accompanying drawings.

BRIEF DESCRIPTION OF THE DRAWINGS

FIG. 4 is a greatly enlarged side sectional view of an attachment arm of the fly trap;

FIG. 5 is a greatly enlarged side sectional view of an attachment bead located on the fly trap 180° away from the attachment arm shown in FIG. 4;

FIG. 6 is an enlarged perspective view of a bait tray;

FIG. 7 is an enlarged perspective view of another bait tray which is connectable to the tray of FIG. 6 and disposed perpendicular thereto;

FIG. 8 is a side view of the fly trap, partially broken away, illustrated in a vertical or hung position.

DESCRIPTION OF THE PREFERRED EMBODIMENTS

Figure 1:
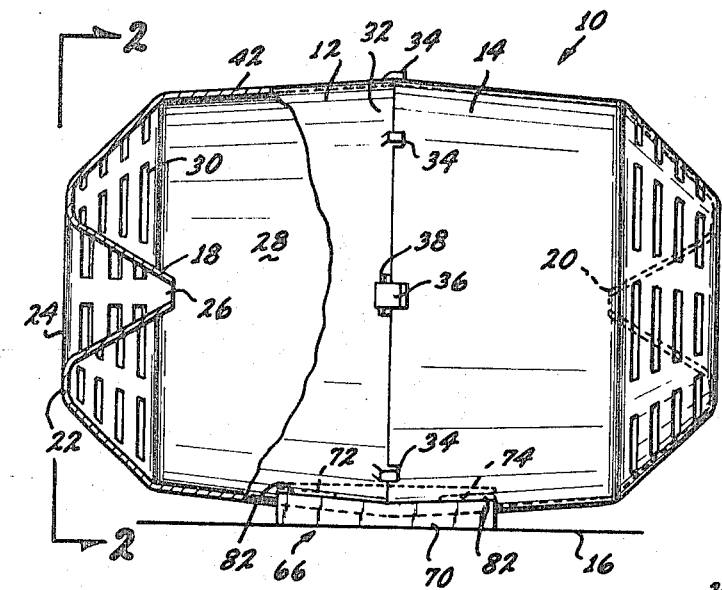
FIG. 1 is a side view of the fly trap in a horizontal position, as the fly trap might be if set upon a table, for example.

While the present invention is susceptible to modifications and alternative constructions an illustrative embodiment is shown in the drawings and will be described in detail hereinbelow. It should be understood however that it is not the intention to limit the invention to the particular form disclosed; but on the contrary the intention is to cover all modifications, equivalences and alternative constructions falling within the spirit and scope of the invention as expressed in the appended claims.

Referring now to FIG. 1, there is illustrated the fly trap apparatus comprised of two identical container members 12 and 14 connected and disposed in a relatively horizontal position upon a surface 16. Located at each end of the fly trap are horizontally disposed funnel shaped openings 18 and 20 which allow a fly to enter the enclosure formed by the two identical container members 12 and 14.

Figure 2:
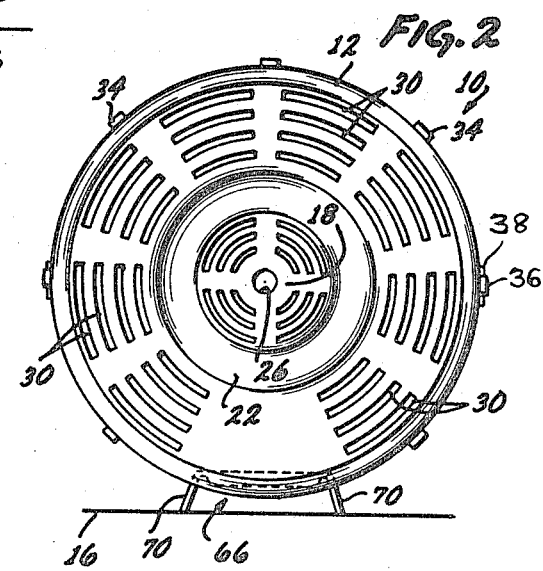
FIG. 2 is a front view of the fly trap taken along line 2—2 of FIG. 1.
Figure 3:
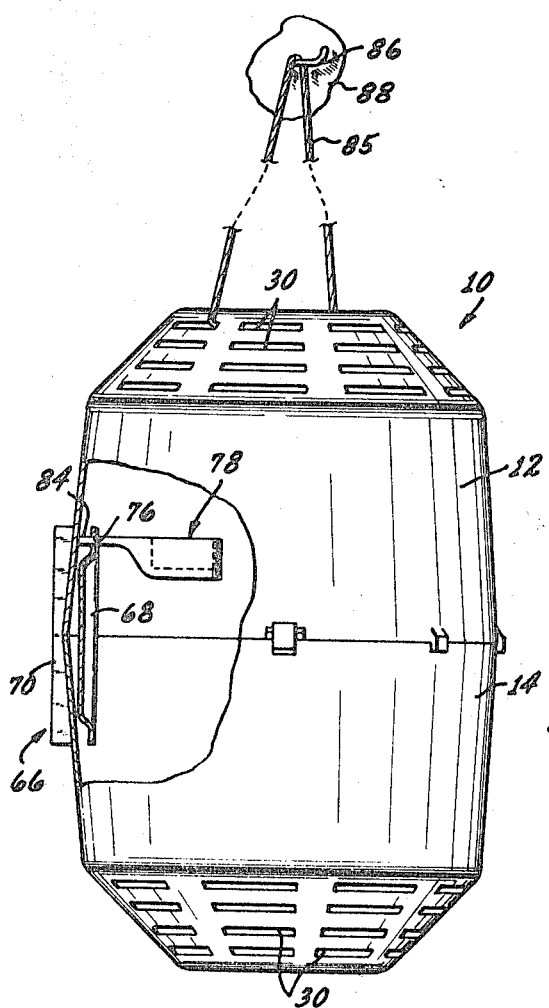
FIG. 3 is a side sectional view of the fly trap.

An important aspect of the present invention is to provide a fly trap apparatus which is simply constructed and therefore economical to produce, and which may be economically packaged to reduce shipping costs and still be suitable for display at a point of sale. Referring to FIGS. 2 and 3, the member 12 will be described in detail, it being understood that the member 14 is identical thereto; therefore to keep the specification concise, member 14 need not be described in detail. The member 12 has a first end portion 22 which includes the funnel shaped opening 18 with the large end of the funnel 24 being at the end of the member 12 and the small end of the funnel 26 being tucked within the member. This funnel shaped opening acts as an entrance for a fly into the interior space 28 of the fly trap apparatus. It has been found that once a fly enters the interior space it will not return through the funnel shaped opening but will remain to die and dehydrate. Also located at the first end portion are a series of concentric arcuate slots 30 which are too small for a fly to pass through but which will allow the aroma of a fly bait within the interior space 28 to permeate the air about the fly trap. This aroma will entice flies into the fly trap interior.

The member 12 also includes a second end portion 32 which comprises a large opening having a peripheral rim 40, a plurality of guide arms 34, an attachment arm and an attachment bead 38. As will be explained hereinbelow, the attachment arm of the member 12 is engageable with an attachment bead of the member 14 while an attachment arm of the member 14 is engageable with the attachment bead 38 of the member 12. In this fashion, the two members or halves of the fly trap can be easily brought together and engaged forming the completed fly trap apparatus as viewed in FIG. 1, for example.

The guide arms 34 engage a peripheral rim of the member 14 while the guide arms on the member 14 engage the peripheral rim 40 of the member 12 thereby acting to properly align the two members during engagement. Integral with the end portions 22 and 32 is a central portion 42 having a converging wall (converging in a direction moving from the end portion 32 toward the end portion 22). As can be appreciated from the drawing of FIG. 3, the converging central portion 42 in conjunction with the full opening of the second end portion and the peculiar design of the first end portion allows the members to be nested one within the other; this is shown with a member 12a being nested within the member 12. With this arrangement, the fly trap apparatus is very compact which is important during shipping and for display at the point of sale. Further, the nested members can be easily packaged such as by simply providing a plastic cover about the members illustrated in FIG. 3.

It is to be understood that the member 12 may be made of any suitable material but is preferably made of a synthetic resin which may be molded as an integral piece as shown in FIGS. 2 and 3, including the funnel shaped opening, the plurality of arcuate slots and the guide and attachment arms. For purposes of illustration one suitable type of packaging is commonly referred to as a blister package; this is a synthetic resin covering formed over the item to be covered with both the blister cover and the fly trap members being supported by a cardboard base (not shown). Also by way of example, a suitable converging angle for the central portion is slightly more than 4° from horizontal as illustrated in FIG. 3 while the funnel may have an angular dimension of slightly more than 61°. It is to be noted however that these angles are not to be considered a limitation in any way upon the invention herein disclosed as the angles may be varied as may the dimensions for the fly trap without changing the inventive concepts disclosed herein.

Referring now to FIGS. 4 and 5, there is illustrated an enlarged view of an attachment arm 36 (FIG. 4) and an attachment bead 38a (FIG. 5). The attachment arm 36 extends beyond the peripheral rim 40 of the end portion 32 and comprises a base bead 50 which spaces the attachment arm at a larger diameter than the peripheral rim 40a of the mating container member. Integral with the base bead 50 is a bridge portion 52 of relatively thin width and a head portion 54. The thin bridge portion 52 allows the head portion 54 to be flexible thereby allowing the head portion to be pulled away or snapped into a locking position with relative ease.

Mateable with the attachment arm is the attachment bead 38a. The attachment bead comprises an enlarged portion 56 over which the head portion 54 of the attachment arm is flexed so as to form a locking engagement; this is accomplished by an abuttment between the attachment arm bearing surface 58 and the attachment bead bearing surface 60. It is to be noted that in the preferred embodiment each of the members are identical and include one attachment arm and one attachment bead. Engagement is achieved by rotating the members relative to each other so as to align an attachment arm of one member with the corresponding bead of the other member. Thus, locking engagement occurs at locations 180° apart.

In order to emphasize once again the simple construction and economical manufacturing potential reference is made to FIGS. 6 and 7. A bait tray 66 is illustrated and comprises a dish portion 68, a base portion 70 and oppositely disposed pairs of slots 72 and 74. An additional slot 76 is provided to receive a second bait tray 78 as will be explained in more detail herein below. As is now readily understood the dish portion 68 may be used to receive any suitable bait 80 while the two pairs of slots 72 and 74 engage corresponding slots in the container members to not only attach the bait tray to the container members but also to strengthen and align the container members and provide the container members with a base on which to stand. For example, the pair of slots 72 engage the pair of slots 82, FIGS. 2 and 3, of the container member 12. In a like fashion the pair of slots 74 are engageable with corresponding slots (not shown) of the member 14. When fully engaged the dish portion 68 of the bait tray is positioned within the interior of the container members while the base portion 70 is positioned outside of the container members and therefore may be used to stand the fly trap on the surface 16 as shown in FIG. 1. As may now be readily appreciated, the interior location of the dish portion of the bait tray places the bait totally outside the reach of, for example, small children. Therefore the apparatus is totally safe.

The second bait tray 78 is comprised of a dish portion 83 and a handle 84. The handle 84 is receivable within the slot 76 so as to position the dish portion 83 in a plane perpendicular to the plane of the dish portion 68. The second bait dish may be used for example when the fly trap is set in a vertical position such as when the fly trap is hung as illustrated in FIG. 8. In the FIG. 8 embodiment the fly trap is suspended by a simple wire cable 84 from any convenient location such as a hook 86 within a supporting structure such as a wall 88. The bait trays may be located within the interior space of the nested container members when packaged so as to require no additional packaging or packaging costs. As mentioned, an important object of the invention is to provide a fly trap which may be used indoors or outdoors. The flexibility offered by the fly trap, to be hung as in FIG. 8 or rested as in FIG. 1, allows the apparatus to be used in homes, patios, offices, farm yards, shops and mines, to name just a few locations.

As mentioned for the container members, the bait trays may be made of any convenient material such as easily moldable synthetic resin material. In the FIG. 1 embodiment, the fly trap apparatus comprises three elements. The two container members and the bait tray 66; in the FIG. 8 embodiment, the fly trap comprises five elements, the two container members, the two bait trays and the wire cable. In either embodiment, it is now readily appreciated that the structure of the fly trap is extremely simple thereby enhancing the low cost of manufacture. With a low cost of manufacture and an effective means of packaging, the fly trap becomes readily available to the consuming public at a reasonable cost.

Other important attributes of the invention mentioned are safety, the ease of use, and the ability to be hung or stood upright and yet appear aesthetically pleasing and decorative. In operation, a purchaser of the fly trap would simply un-nest the container members, fill the bait tray with an appropriate bait (for example, food scraps) engage the slots of the bait tray with the slots of the container members and snap the container members together. Once this is done, the fly trap may be set upon any surface such as a table or a floor as illustrated in FIG. 1. If it is desired to hang the fly trap then it is necessary to insert the second bait tray 78 within the slot 76 of the first bait tray and engage the slots of the bait tray 66 with the slots of the container members. The container members are then snapped together and a wire or string is attached through the arcuate slots and hung from an appropriate hook. The fly trap is easily cleaned by moving the attachment arms out of engagement with the attachment beads, separating the container members, emptying the dead flies and resupplying the bait.

Clearly what has been shown is an improved fly trapping and retention apparatus which is very simply constructed, which has few parts, which may be easily used and which is marketable at a very reasonable cost.

I claim:

1. A trap for attracting and retaining flies comprising:

a first hollow member having a first end portion including a funnel shaped opening for the passage of flies into said trap and a plurality of apertures too small for the passage of flies, and a second end portion including a large opening, a guide arm, and connecting means including an attachment arm and an attachment bead;

a second member structurally identical to said first member, said attachment arm of said first member being engagable with the attachment bead of said second member, and the attachment arm of said second member being engagable with said attachment bead of said first member, whereby said first and second members are engagable along the second end portions of said members, said second end portions of said first and second members having means including slots for attaching a bait tray element thereto;

a bait tray element having engaging means removably receivable by said slots of said first and second member, said bait tray element including a bait supporting dish and a trap supporting base, said bait supporting dish being positioned within said first and second members, and said supporting base being positioned outside when said members are engaged and said engaging means is in said slots.

2. An apparatus as claimed in claim 1 wherein said attachment arms are flexible and each includes an enlarged head portion engageable with a corresponding attachment bead.

3. A trap for attracting and retaining flies comprising:

a first hollow member having a first end portion including a funnel shaped opening for the passage of flies into said trap and a plurality of apertures too small for the passage of flies, and a second end portion including a large opening, a guide arm, and connecting means including an attachment arm and an attachment bead;

a second member structurally identical to said first member, said attachment arm of said first member being engagable with the attachment bead of said second member, and the attachment arm of said second member being engagable with said attachment bead of said first member, whereby said first and second members are engagable along the second end portions of said members, said second end portions of said members having attaching means including slots for receiving a tray;

a first bait tray removably receivable by said slots and having a bait supporting area located within said hollow members when the trap is assembled;

a second bait tray having a bait supporting area, and means on said trays for removably interconnecting them with said areas in mutually perpendicular relation within said trap.

* * * * *